United States Patent [19]
Lev et al.

[11] Patent Number: 5,608,779
[45] Date of Patent: Mar. 4, 1997

[54] METHOD FOR COMMUNICATIONS BETWEEN MOBILE UNITS USING SINGLE AND MULTIPLE SWITCHING CENTER CONFIGURATIONS

[75] Inventors: Valy Lev, Buffalo Grove; Kamala Urs, Bartlett; Hooman Kashef, Hoffman Estates, all of Ill.

[73] Assignee: Motorola, Inc., Schaumburg, Ill.

[21] Appl. No.: 336,347

[22] Filed: Nov. 8, 1994

[51] Int. Cl.⁶ .............................. H04Q 7/22; H04Q 7/38
[52] U.S. Cl. .............................. 379/88; 379/59; 455/33.1
[58] Field of Search .................................. 379/58, 59, 60; 455/33.1, 33.2

[56] References Cited

U.S. PATENT DOCUMENTS 5,299,198  3/1994  Kay et al. ............................... 370/95.3
5,475,689  12/1995 Kay et al. ............................... 370/95.3

Primary Examiner—Dwayne D. Bost
Assistant Examiner—Nay Aung Maung
Attorney, Agent, or Firm—Christopher P. Moreno

[57] ABSTRACT

Communication systems having single switching center configurations (100) or multiple switching center configurations (200) detect the occurrence of a mobile-to-mobile call using control messages. When it is determined that the call is mobile-to-mobile, a switching center (101) in the single switching center configuration instructs transcoders (121–123) to operate in a transparent mode. Likewise, when it is determined that the call is mobile-to-mobile, multiple switching centers (201–203) the multiple switching center configuration instruct transcoders (221–223) to operate in the transparent mode. While operating in the transparent mode, the transcoders do not convert compressed digital voice (402) to non-compressed digital voice (401) and vice versa, but do allow the compressed digital voice to pass through as bit-stuffed compressed digital voice (403) and vice versa.

26 Claims, 8 Drawing Sheets

METHOD FOR COMMUNICATIONS BETWEEN MOBILE UNITS USING SINGLE AND MULTIPLE SWITCHING CENTER CONFIGURATIONS

FIELD OF THE INVENTION

The present invention relates generally to communication system and, in particular, to a method for communications between mobile units using single and multiple switching center configurations.

BACKGROUND OF THE INVENTION

Communication systems are known to comprise mobile units (i.e., hand-held portable or in-car mobile radiotelephones) that wirelessly communicate digitally-represented voice signals within sites controlled by site controllers. Often, site controllers communicate with a switching center so that multiple sites can communicate with each other via the switching center. Current switching centers typically route voice signals in non-compressed digital voice formats, e.g., a pulse-code modulation (PCM) format. In contrast, mobile units typically transmit and receive voice signals in the form of compressed digital voice, e.g., data packets created through the use of a vector-sum excited linear predictive (VSELP) voice coder.

Transcoders are provided to perform the conversions, when required, between the compressed digital format and the non-compressed digital format and vice versa. A typical example occurs when a land-based telephone, using a non-compressed digital format, communicates with a mobile unit via the switching center. In this situation, compressed digital voice from the mobile unit is converted into the non-compressed digital format by a transcoder associated with the appropriate site controller. The non-compressed digital voice is then routed, via the switching center, to the land-based telephone. When communicating from the telephone to the mobile unit, the process is reversed.

Another situation in which transcoders are used occurs in calls between two mobile units. In this case, compressed digital voice from a first mobile is converted to a non-compressed format by a transcoder and sent through a site controller to a switching center. The switching center, in turn, routes the non-compressed voice possibly to the same site controller or another site controller, which re-converts the non-compressed voice, via another transcoder, to the compressed format. The re-compressed digital voice is then transmitted to the second mobile via the site controller. As known in the art, conversions by a transcoder add delay to the transmission of the message and slightly degrade the resulting quality of the voice. Thus, calls requiring more than one conversion, as in the present example, may be subjected to prohibitive delays and audio degradation.

An attractive solution to this problem is to allow compressed digital voice signals to be transparently passed through the transcoders, and hence through the switching center, when a mobile-to-mobile call is established. In this manner, the delays and audio degradation inherent in the conversion process can be avoided. Assuming that transcoders can operate in this manner, i.e., transparently passing compressed voice, current switching center technology does not provide the necessary control for such operations.

The problem described above is exacerbated when voice messages are required not only to span multiple transcoders, but also to span multiple switching centers. Even if the transcoders affiliated with each switching center are capable of passing compressed digital voice, operations associated with the inter-switching center communication link must be similarly controlled. For example, the echo-cancellation found on most inter-switching center communication links would need to be disabled when passing compressed digital voice. Current methods for controlling the operations of switching centers do not address the need to pass compressed voice between switching centers, i.e., a mobile-to-mobile call is treated similarly to any other type of call. Therefore, a need exists for a method that overcomes the prior art difficulties associated with multiple transcoder format conversions required for mobile-to-mobile calls. Additionally, mobile-to-mobile calls that span multiple switching centers must also be able to avoid multiple transcoder format conversions.

DESCRIPTION OF THE PREFERRED EMBODIMENT

The present invention provides a method for establishing and maintaining calls between mobile units in single and multiple switching center configurations such that multiple transcoder format conversions are avoided. In a single switching center configuration, a call request from a first mobile unit is received, causing the switching center to instruct a first transcoder, associated with the first mobile unit, to operate in a transcoding mode. When it is determined that a target of the call request is a second mobile unit, the switching center instructs a second transcoder, associated with the second mobile unit to operate in a transparent mode. When the second mobile unit has responded to the call, the first transcoder is instructed to operate in the transparent mode.

In a multiple switching center configuration, a call request is received, from a first mobile unit, by a first switching center, which then instructs a first transcoder to operate in the transcoding mode. The call request includes a phone number of a second mobile unit. The first switching center sends a first switching center address, a call process identification, and the phone number to a home location register.

In turn, the home location register determines an identification of the second mobile unit, which is then sent along with the first switching center address and call process identification to a visiting location register. The visiting location register determines a roaming phone number of the second mobile unit and forwards the roaming phone number to the first switching center via the home location register. Using, the roaming phone number, the first switching center can establish a phone call with the second switching center. The second switching center queries the visiting location register to determine the first switching center address and call process identification. After establishing communications with the second communication unit and instructing a second transcoder, associated with the second mobile unit, to operate in the transparent mode, the second switching center sends the call process identification to the first switching center. The first switching center then instructs the first transcoder to operate in the transparent mode. Using these methods, the present invention overcomes difficulties of multiple transcoder format conversions associated with prior art methods of establishing mobile-to-mobile communications.

Figure 1:
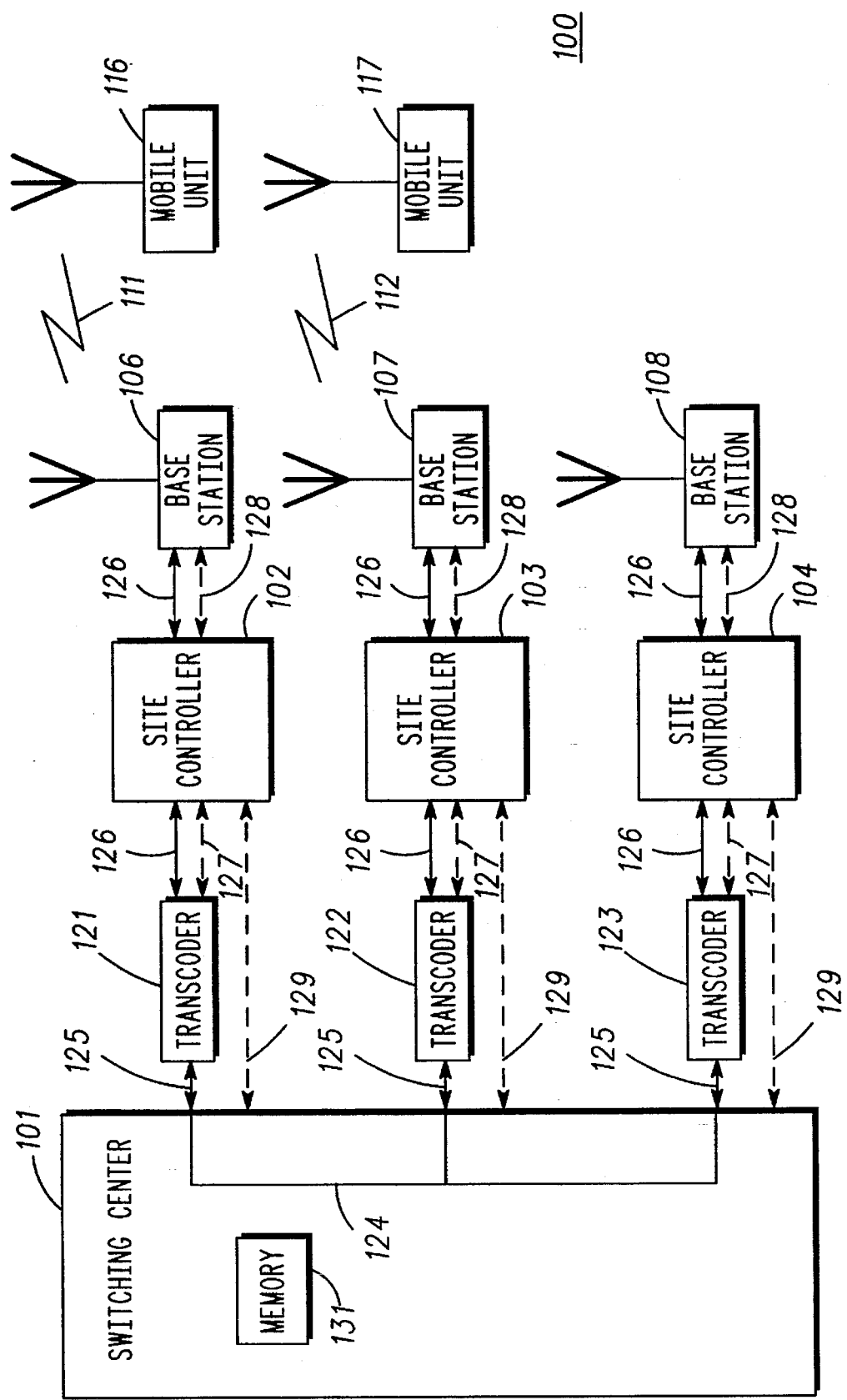
FIG. 1 is a box diagram of a communication system having a single switching center configuration.

The present invention can be more fully described with reference to FIGS. 1–7. FIG. 1 shows a communication system (100) having a single switching center configuration that may be used to implement the present invention. For example, the communication system (100) may comprise a system in conformance with Groupe Speciale Mobile (GSM) standards. Such a system is typically used to provide communications over a single geographic region, i.e., a city. The communication system (100) comprises a switching center (101) in communication with site controllers (102–104) via transcoders (121–123). The site controllers (102–104) control the operations of base stations (106–108), which are in wireless communication, via wireless communication resources (111–112), with a plurality of mobile units (116–117). The switching center (101) may comprise a Digital Multiplex System Mobile Switching Center (DMS MSC) by Northern Telecom. The site controllers (102–104) and the transcoders (121–123) may comprise Base Station Controllers (BSCs) and transcoders, respectively, manufactured by Motorola, Inc. Additionally, the mobile units (116–117) may comprise digital MicroTAC® portable radiotelephones by Motorola, Inc.

Typically, voice information is passed between the switching center (101) and the transcoders (121–123), via a wired voice link (125), in a non-compressed digital voice format, i.e., a 64 Kbit pulse code modulation (PCM) format. Within the switching center (101), the non-compressed digital voice is routed through a digital switch matrix (124), as known in the art. In contrast, the mobile units (116–117) transceive voice information in the form of compressed digital voice. For example, mobile units in accordance with GSM standards use a regular pulse excitation linear predictive coder (RPE-LPC) having a 13 Kbit format. The wireless communication resources (111–112), which may comprise radio frequency (RF) carriers divided in time in to time slots, convey the compressed digital voice between the mobile units (116–117) and the base stations (106–107). In turn, the compressed digital voice is sent between the base stations (106–108), site controllers (102–104), and transcoders (121–123) via wired voice links (126).

The transcoders (121–123) operate under the control of the switching center (101) and site controllers (102–104). To this end, wired control links (127,129) are provided between the switching center (101) and the site controllers (102–104) as well as the site controllers (102–104) and the transcoders (121–123). A wired control link (128) is also provided between the site controllers (102–104) and the base stations (106–108). Note that the wired voice links (125–126) and the wired control links (127–129) typically comprise Public Switched Telephone Network (PSTN) resources, such as T1 telephone lines, as known in the art. Also, note that the transcoders (121–123) may be provided as part of the site controllers (102–104) (i.e., individual circuit boards within the controller hardware), or they may be provided as separate physical entities apart from the site controllers (102–104).

As discussed in greater detail below, the switching center (101) determines when calls originated by mobile units (116–117) are intended for other mobile units (116–117) to control the operating mode of the transcoders (121–123). When a mobile-to-mobile call is detected, the required transcoders (121–123) are instructed to operate in a transparent mode; compressed digital audio is essentially passed through the transcoders without conversion, thereby eliminating double format conversions. When necessary, the transcoders (121–123) can also operate in a transcoding mode; that is, compressed digital audio is converted in to non-compressed digital audio and vice versa. To maintain continuity throughout the system (100), the operating modes of each transcoder (121–123) is stored in memory (131) of the switching center (101). In addition to single switching center configurations, the present invention also addresses cases of mobile-to-mobile calls spanning multiple switching centers.

Figure 2:
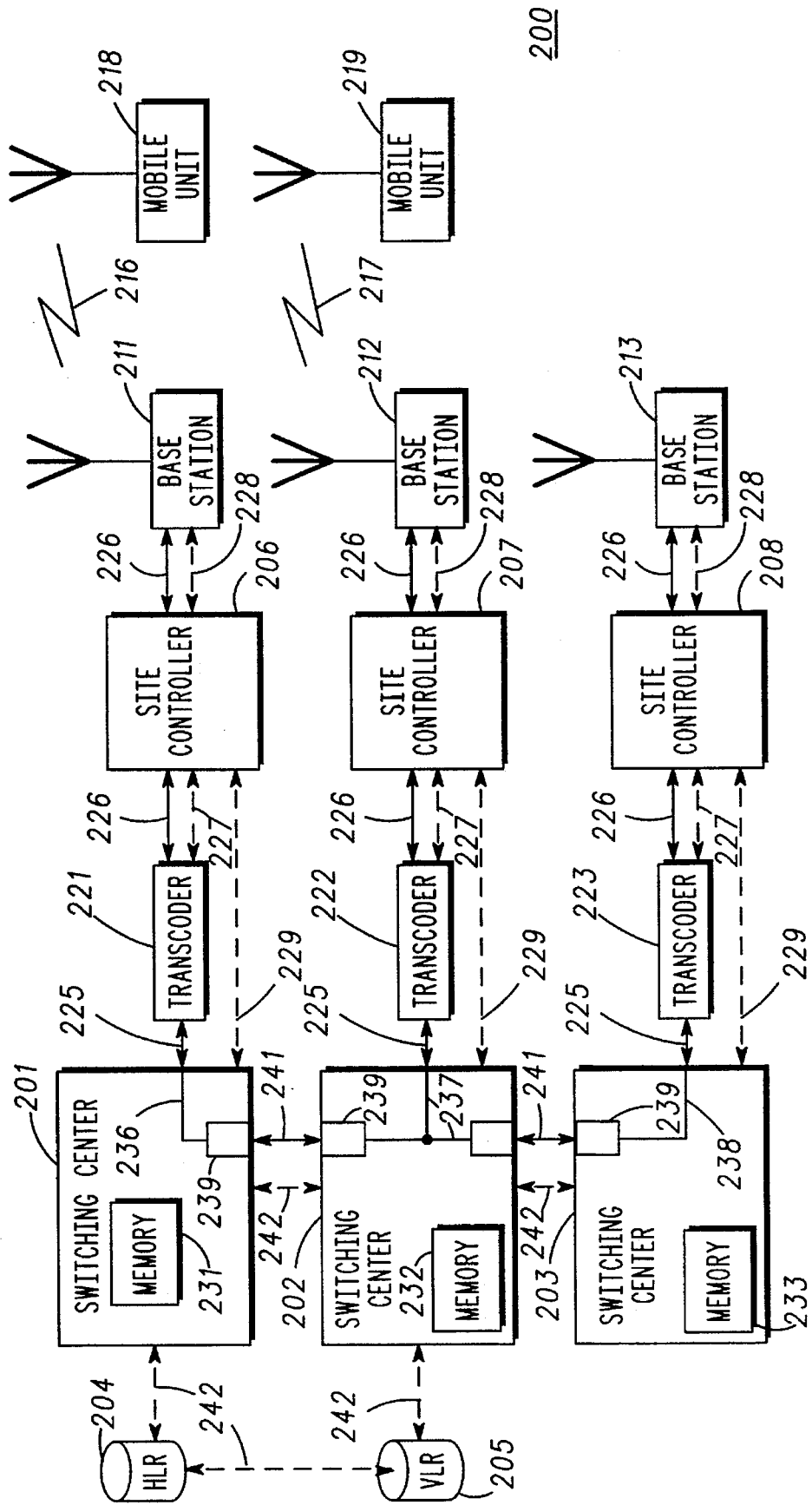
FIG. 2 is a box diagram of a communication system having a multiple switching center configuration.

FIG. 2 shows a communication system (200) having a multiple switching center configuration that may be used to implement the present invention. Similar to the system (100) of FIG. 1, the communication system (200) may comprise a system in conformance with GSM standards. Such a system typically provides communications over a variety of geographic locations, i.e., cities in different states. The communication system (200) comprises switching centers (201–203) in communication with site controllers (206–208) via transcoders (221–223). The site controllers (206–208) control the operations of base stations (211–213), which are in wireless communication, via wireless communication resources (216–217), with a plurality of mobile units (218–219). Each of the above-listed elements of the system (200), including wired voice links (225–226), wired control links (227–229), digital switch matrices (236–238), and memories (231–233), are essentially identical to those listed with respect to FIG. 1, with the following exceptions and additions.

The switching centers (201–203) communicate via wired voice links (241) and wired control links (242), i.e., T1 telephone lines. In the present invention, the wired voice links (241) convey non-compressed as well as compressed digital voice between the switching centers (201–203). As known in the art, echo cancelers (239) are also provided for use with the wired voice links (241). Echo cancelers (239) are used to mitigate the effects of echoing known to occur in transmission lines. However, the present invention anticipates that the echo cancelers (239) will be disabled when passing compressed digital voice, as described in further detail below.

Home location registers (HLRs) (204) and visiting location registers (VLRs) (205) are also provided. Although only one home location register (204) and visiting location register (205) are shown in FIG. 2 for clarity, the switching centers (201–203) each have access to associated home and visiting location registers. Additionally, the home location registers (204) and visiting location registers (205) may communicate with each other, as known in the art. Each of the home location registers (204) and visiting location registers (205) include information regarding the service provisions (e.g., features) and location for their associated mobile units (218–219). Additionally, each of the home location registers (204), visiting location registers (205), and memories (231– 233) contain so-called global title translation tables. The global title translation tables associate mobile units, based on mobile unit identification information, with unique address information of the switching centers (201–203), home location registers (204), and visiting location registers (205).

Figures 3, 4:
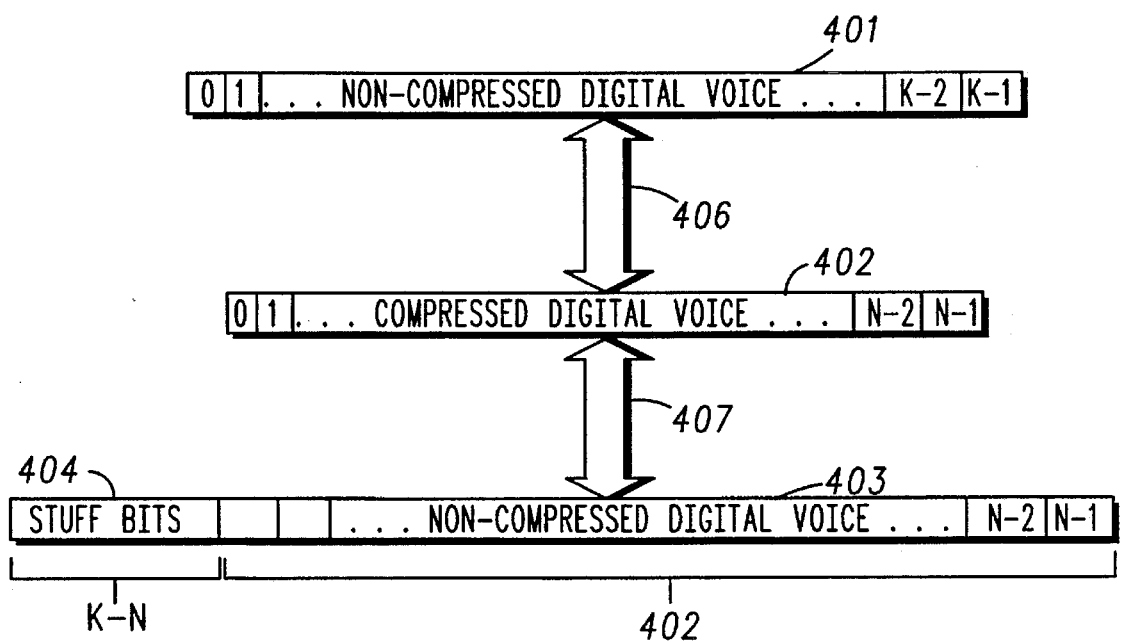
FIG. 3 illustrates transcoder input/output data format relationships in accordance with the present invention.
FIG. 4 illustrates the data formats shown in FIG. 3.

As mentioned previously, the transcoders shown in FIGS. 1 and 2 can operate in a transcoding mode and a transparent mode. FIG. 3 illustrates the data format relationships of the transcoders when operating in the transcoding or transparent mode. In FIG. 3, the two columns represent the two operating modes, i.e., transcoding or transparent. The two rows represent the direction of the digital voice being processed by the transcoder; outbound voice comprises digital voice from a switching center destined for a site controller and mobile unit, inbound voice comprises digital voice from a mobile unit via a site controller destined for a switching center. The inbound and outbound rows are further subdivided into inputs and outputs to a transcoder for that direction.

Thus, regardless of the operating mode, inbound input (i.e., from a site controller to a switching center) takes the form of compressed digital voice. When operating in the transcoding mode, the inbound compressed digital voice is converted into non-compressed digital voice. When operating in the transparent mode, the inbound compressed digital voice is passed through the transcoder in the form of bit-stuffed compressed digital voice, as described below.

In a similar fashion, outbound output (i.e., from a switching center to a site controller) takes the form of compressed digital voice, regardless of the operating mode. When operating in the transcoding mode, the compressed digital voice is produced by converting non-compressed digital voice input to the transcoder. When operating in the transparent mode, the compressed digital voice is extracted from the bit-stuffed compressed digital voice input to the transcoder.

FIG. 4 illustrates the differences between the data formats discussed with respect to FIG. 3. As shown, an N-bit packet of compressed digital voice (402) can be converted, by a transcoder operating in the transcoding mode (406), into a K-bit packet of non-compressed digital voice (401), and vice versa, wherein K is greater than N. Also, the N-bit packet of compressed digital voice (402) can also be passed through the transcoder operating in the transparent mode (407) as a K-bit packet of bit-stuffed compressed digital voice (403). As shown, the K-bit packet of bit-stuffed compressed digital voice (403) comprises the compressed digital voice (402) prefixed by K-N stuff bits (404).

In a preferred embodiment, the stuff bits (404) are set to binary zeros so that even if the bit-stuffed compressed digital voice (403) is mistakenly decoded as non-compressed digital voice (401), it will appear to be low-amplitude noise, thereby minimizing any negative audio quality effects. Of course, an N-bit packet of compressed digital voice (402) can be recovered from a K-bit packet of bit-stuffed compressed digital voice (403) by stripping off the K-N stuff bits (404). Using the bit-stuffed compressed digital voice (403) to mimic the properties (i.e., length) of non-compressed digital voice (401), the present invention allows compressed digital voice (402) to transparently pass through a switching center, thereby eliminating the need for multiple transcoder conversions.

Figure 5A:
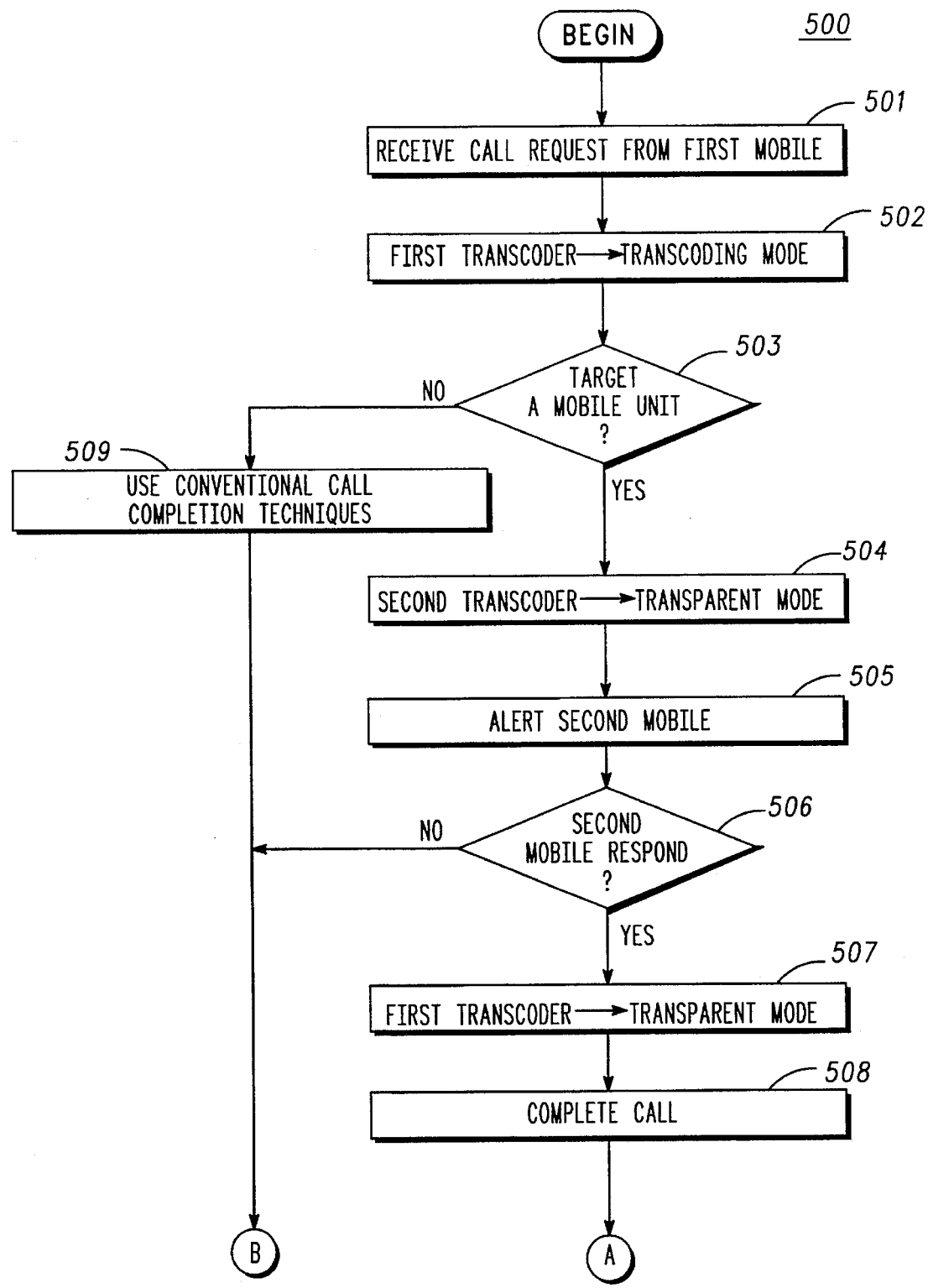
FIGS. 5A and 5B comprise a flow chart of a method for establishing and maintaining a call between mobile units in a single switching center configuration.
Figure 5B:
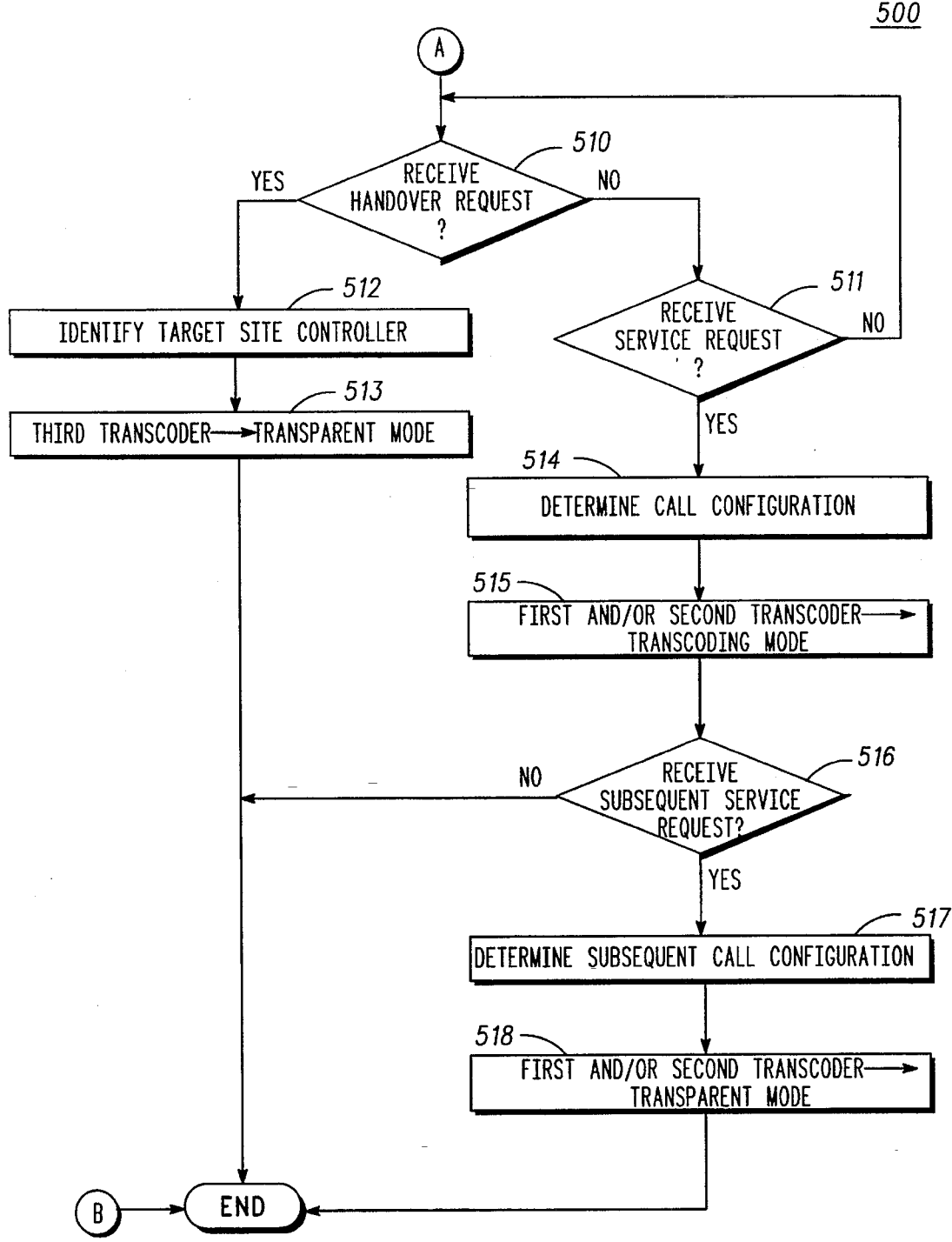

FIG. 5 is a flowchart (500) of a method for establishing and maintaining a mobile-to-mobile call in a communication system having a single switch configuration. Hereinafter, it is assumed that the communication system described conforms to known GSM standards except as provided by the present invention. Nonetheless, the present invention anticipates that other types of communication systems having similar structures can be adopted for use with the present method.

At step 501, a call request from a first mobile unit (116) is received at the switching center (101) via a first site controller (102). The call request includes an identification of a target unit. The target unit may comprise another mobile unit operating under the control of the first site controller (102) or another site controller (103–104).

At step 502, responsive to the call request, the switching center (101) instructs a first transcoder (121), associated with the first site controller (102) and the first mobile unit (116), to operate in the transcoding mode. While operating in the transcoding mode, the first transcoder (121) can convert non-compressed digital audio data (e.g., quiet tone, ringing tones, etc.) destined for the first mobile unit (116) in to the appropriate compressed digital format. Using resident memory (131), the switching center (101) keeps track of the first transcoder's operating mode. In addition to instructing the first transcoder (121), the switching center (101) also executes know resource assignment procedures in conjunction with the first site controller (102) at this step.

At step 503, the switching center (101) determines if the target unit is a mobile unit. This can be done by comparing the identification of the target unit with a table of known mobile unit identifications stored in the switching center's memory (131). If the target unit is not a mobile unit, the process continues at step 509 where conventional call completion techniques are use to complete the call.

If, however, the target unit is identified as a second mobile unit (117), the switching center (101) instructs, at step 504, a second transcoder (122), associated with the second mobile unit (117) and the first site controller (102) or a second site controller (103), to operate in the transparent mode. This is done because the switching center (101) now knows that the ensuing call is going to be mobile-to-mobile, therefore, transcoding is not necessary. The second transcoder (122) is associated with the first site controller (102) if the second mobile unit (117) operates within the control of the first site controller (102). Likewise, the second transcoder (122) is associated with the second site controller (103) if the second mobile unit (117) operates within the control of the second site controller (103). For the purposes of illustration, it is assumed that the second transcoder (122) is associated with a second site controller (103). As before, the switching center keeps track of the second transcoder's operating mode in memory (131).

At step 505, the switching center (101) alerts the second mobile (117), via the second site controller (103), of the call. If, at step 506, the second mobile unit (117) does not respond, as a result of being out of range for example, the process is ended because the call cannot be completed. However, if the second mobile unit (117) does respond, the switching center (101) instructs the first transcoder (121) to operate in the transparent mode at step 507. With both the first and second transcoders (121–122) operating in the transparent mode, compressed digital voice, in the form of bit-stuffed compressed digital voice, as discussed above, can be passed through the switching center (101), thereby eliminating multiple transcoder conversions. In order to complete the call at step 508, the digital switch matrix (124) is configured to allow the call to proceed.

As mentioned at steps 502, 504, and 507, the switching center (101) controls the operating modes of the relevant transcoders (121–122). To accomplish this, the wired control links (127–129) are used. More particularly, using the first transcoder at step 502 as an example, the switching center (101) passes control information to the first site controller (102) via a first wired control link (129) (A-interface in GSM terminology) instructing the first site controller (102) to notify the first transcoder (121) of the mode change. If the first transcoder (121) is included in the first site controller (102), this is done directly. If, however, the first transcoder (121) is located apart from the first site controller (102), the first site controller (102) uses a second wired control link (127) to notify the transcoder of the mode change. As necessary, the control information sent by the switching center is changed to achieve the desired mode change. The protocol used to exchange control information between switching centers, site controllers, and transcoders is discussed in greater detail below with reference to FIG. 8.

Once the mobile-to-mobile call has been completed, a handover request can be received by the switching center (101) from either the first of second mobile unit (116–117), as shown at step 510. A handover request is sent whenever a mobile unit currently engaged in a call changes its location, and hence, site controllers. This could occur when no other resources are available at other site controllers. Regardless, the switching center (101) determines an identity of a third site controller at step 512. The third site controller could be any of the site controllers currently involved in the call, i.e., the first site controller (102) or the second site controller (103). This could occur if there are no resources available at any other site controllers. For the purposes of illustration, it is assumed that the third site controller (104) is distinct from the first and second site controllers (102–103).

At step 513, the switching center (101) instructs a third transcoder (123), associated with the third site controller (104), to operate in the transparent mode. This is done as described above. In this manner, the call can continue as the roaming mobile unit changes locations.

If, however, a handover request is not received at step 510, it is determined at step 511 if the switching center (101) has received a service request requiring a mode change in the first and/or second transcoders (121–122). Such a service request may be a request to process a pending call-waiting call or to establish a three-party conference call. If a service request is not received, the process can return to step 510, as shown, or it can be terminated altogether.

If a service request is received, a call configuration is determined by the switching center (101) at step 514. That is, the switching center (101) determines the operating modes of the first and second transcoders (121–122). Based on the call configuration and the service request, the switching center (101) instructs the first and/or second transcoder (121–122) to operate in the transcoding mode at step 515. For example, if a three-party conference call is requested by either the first or second mobile units (116–117), the switching center (101) instructs the both the first and second transcoders (121–122) to operate in the transcoding mode, since summation on a conference bridge is done using a non-compressed data format. As another example, if the first mobile unit (116) requests processing of a pending call-waiting call, the second transcoder (122) is switched to the transcoding mode since it is connected to a non-compressed source of quiet tone during the call-waiting call. The first transcoder (121) is switched to the transcoding mode if the call-waiting call is not from another mobile unit. If the call-waiting call is from another mobile unit:, the first transcoder (121) can remain in the transparent mode.

At step 516, it is determined if a subsequent service request requiring a mode change in the first and/or second transcoders (121–122) is received. Such a service request may be a request to terminate an ongoing call-waiting call or to three-party conference call.

If a subsequent service request is received, a call configuration is determined by the switching center (101) at step 517. As before, the switching center (101) determines the operating modes of the first and second transcoders (121–122). Based on the subsequent call configuration and the subsequent service request, the switching center (101) instructs the first and/or second transcoder (121–122) to operate in the transparent mode at step 518. Continuing the previous examples, if a three-party conference call is to be terminated, leaving only the first and second mobile units (116–117) in the call, the switching center (101) instructs the both the first and second transcoders (121–122) to operate in the transparent mode, since summation by a conference bridge is no longer needed. If an ongoing call-waiting call for the first mobile unit (116) is to be terminated, the second transcoder (122) is switched to the transparent mode. Likewise, the first transcoder (121) is switched to the transparent mode if it was in the transcoding mode during the call-waiting call. Using the above-described method, call establishment and maintenance of a mobile-to-mobile call is achieved such that multiple transcoding conversions are avoided when possible.

Figure 6A:
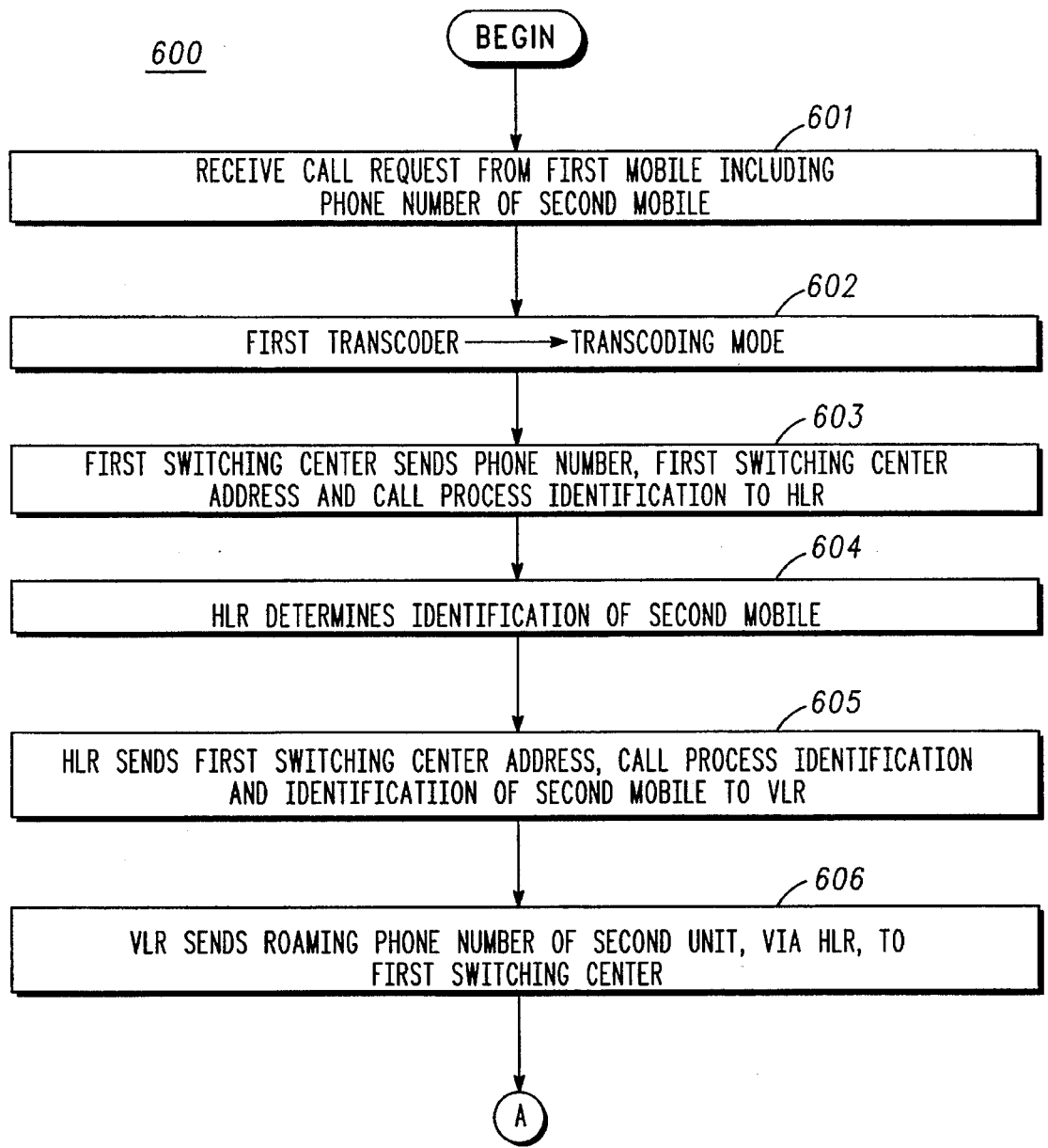
FIGS. 6A and 6B comprise a flow chart of a method for establishing a call between mobile units in a multiple switching center configuration.
Figure 6B:
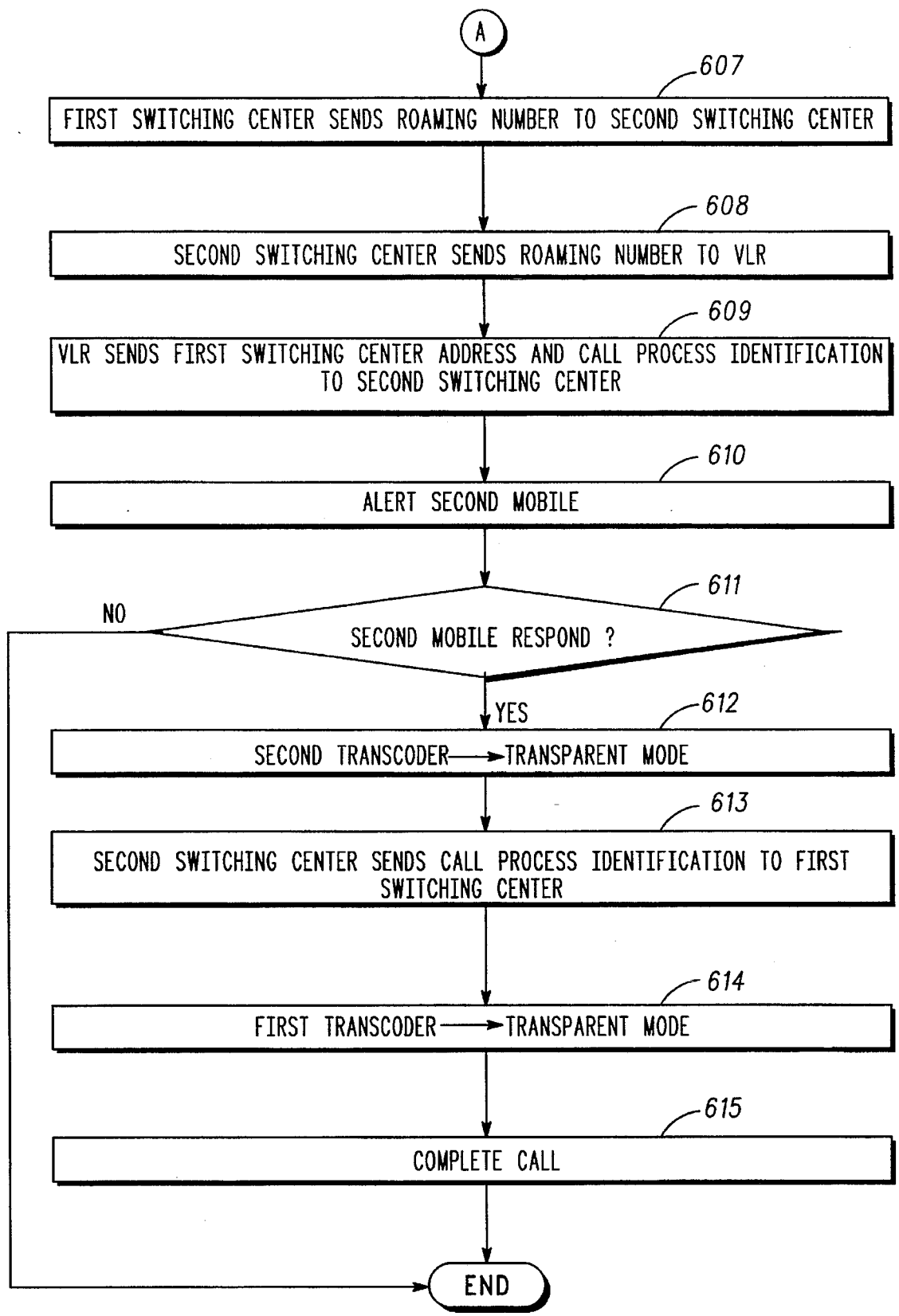

FIG. 6 is a flowchart (600) of a method for establishing a mobile-to-mobile call in a multiple switch configuration. Hereinafter, it is assumed that the communication system described conforms to known GSM standards except as provided by the present invention. Nonetheless, the present invention anticipates that other types of communication systems having similar structures can be adopted for use with the present method.

At step 601, a call request from a first mobile unit (218) is received at a first switching center (201) via a first site controller (206). The call request includes a phone number of a second mobile unit (219) currently affiliated with a second switching center (202). The phone number of the second mobile unit (219) may comprise a conventional PSTN phone number.

At step 602, responsive to the call request, the first switching center (201) instructs a first transcoder (221), associated with the first site controller (206) and the first mobile unit (218), to operate in the transcoding mode. Using resident memory (231), the switching center (201) keeps track of the first transcoder's operating mode. In addition to instructing the first transcoder (221), the first switching center (201) also executes know resource assignment procedures in conjunction with the first site controller (206) at this step. Note that at this point, the first switching center (201) is not aware that the second mobile unit (219), so labeled for clarity, is indeed a mobile unit.

At step 603, the first switching center (201) sends a first routing information request to the HLR (204). The first routing information request includes the phone number of the second mobile unit, a first switching center address, and a call process identification. The first switching center address is determined using the global title translation table stored in memory (231) of the first switching center (201). The call process identification identifies the requested call according to a unique software process identification, such as a task number, as known in the art.

Responsive to the first routing information request, the HLR (204) determines, at step 604, an identification of the second mobile unit based on the phone number. The identification of the second mobile unit may comprise a unique, non-phone number, mobile identification as known in the art. At step 605, the HLR (204) sends the identification of the second mobile unit, along with the first switching center address and call process identification, to the VLR (205) in the form of a second routing information request. As the second mobile unit (219) is currently operating within the control of the second site controller (207), the VLR (205) sends, at step 606, a roaming phone number, based on the identification of the second communication unit, back to the first switching center (201) via the HLR (204). The first switching center address and call process identification are stored by the VLR (205) for later use in conjunction with the roaming phone number.

At step 607, the first switching center (201) sends a phone call request to the second switching center (202). The phone call request includes the roaming phone number of the second communication unit (219). The second switching center (202) sends a third routing information request that includes the roaming phone number to the VLR (205) at step 608, and at step 609, using the roaming phone number, the VLR (205) retrieves the first switching center address and call process identification and sends them to the second switching center (202).

Additionally, the second switching center (202), at step 610, alerts the second mobile (219), via the second site controller (207), of the call. If, at step 611, the second mobile unit (219) does not respond, as a result of being out of range for example, the process is ended because the call cannot be completed. However, if the second mobile unit (219) does respond, the second switching center (202) instructs the second transcoder (222), at step 612, to operate in the transparent mode.

At step 613, the second switching center (202) sends a mobile-to-mobile connection message, including the call process identification, to the first switching center (201) based on the first switching center address. Since it is possible that the original phone call request between the first switching center (201) and second switching center (202) was routed through multiple PSTN networks, the first switching center address is needed by the second switching center (202) to locate the first switching center (201).

Upon receiving the mobile-to-mobile connection message, the first switching center (201) becomes aware that the call identified by the call process identification is actually a mobile-to-mobile call. Thus, at step 614, the first switching center (201) instructs the first transcoder (221) to operate in the transparent mode. With both the first and second transcoders (221–222) operating in the transparent mode, compressed digital voice, in the form of bit-stuffed compressed digital voice can be passed through both the first and second switching centers (201–202), thereby eliminating multiple transcoder conversions. In order to complete the call, at step 615, the digital switch matrices (236–237) are configured to allow the call to proceed. Also at step 615, the echo cancelers (239) are disabled. This is done to eliminate any signal processing normally done to non-compressed digital voice, but that would cause significant distortion to compressed digital voice in the bit-stuffed representation described above.

The methods used by switching centers described above (FIG. 5) to control transcoders are equally applicable to the present discussion. That is, first and second wired control links (229,227) are used to pass control information to the first and second transcoders (221–222). Additionally, the wired voice and control links (241–242) provided between the switching centers (201–203), HLR (204), and VLR (205) convey the control information described in steps 603–609 and step 613. The protocol used to exchange control information between switching centers, HLRs, and VLRs is discussed in greater detail below with reference to FIG. 9.

Figure 7:
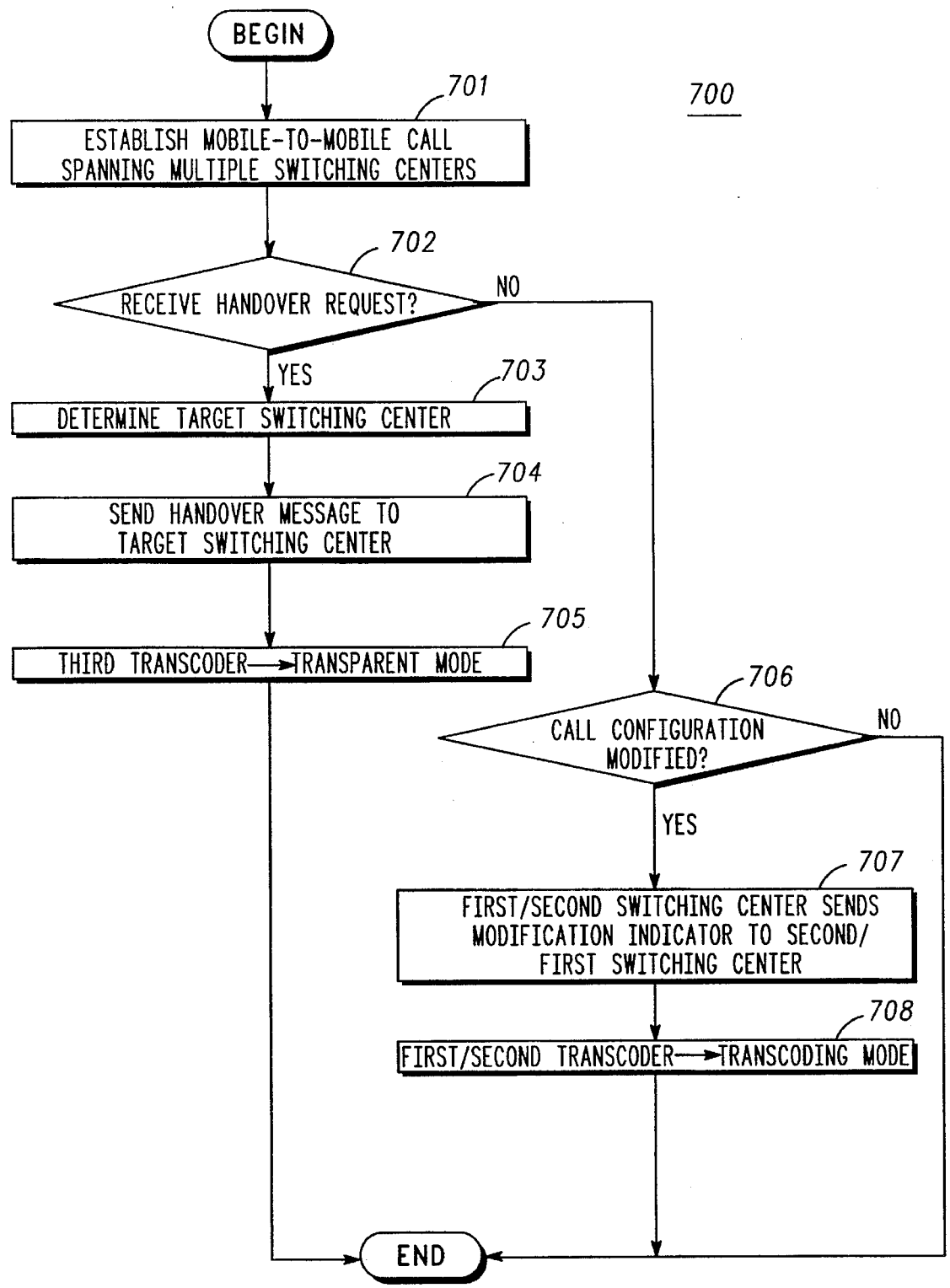
FIG. 7 is a flow chart of a method for maintaining a call between mobile units in a multiple switching center configuration.

As in the single switching center case, the present invention allows mobile-to-mobile calls in a multiple switch configuration to be maintained, as described by the method shown in FIG. 7. At step 701, a mobile-to-mobile call spanning multiple switching centers is established as described in FIG. 6. Thus, as an example, it is assumed that the first mobile unit (218) associated with the first site controller (206) on the first switching center (201) is in communications with the second mobile unit (219) associated with the second site controller (207) on the second switching center (202). At step 702, it is determined if a handover request has been received, for instance, by either the first or second switching centers (201–202). Assume that the second switching center (202) has received a handover request from the second mobile unit (219).

At step 703, the switching center that has received the handover request—in this case, the second switching center (202)—determines a target switching center; that is, a switching center required to complete the handover request. Continuing with the example, note that it is possible for the target switching center to be either the first or the second switching center (201–202). This could occur if it is determined that either of those switching centers was the best possible for completing the handover request. For the purposes of illustration, it is assumed that the third switching center (203) comprises the target switching center.

Having identified the third switching center (203) as the target switching center, the second switching center (202) sends a handover message to the third switching center (203) at step 704. The handover message includes notification that the transcoder used to complete the call at the third switching center (203) should operate in the transcoding mode since this is a mobile-to-mobile call. Thus, at step 705, the third switching center (203) instructs a third transcoder (223), associated with a third site controller (208), to operate in the transparent mode. As completion of the call through the third switching center (203) is completed, the echo canceler (239) associated with the third switching center (203) is disabled. Inherent to this example, it is assumed that the third site controller (208) is indeed the proper site controller to be handling the handover; other site controllers in communication with the third switching center (203) could be similarly used.

If, however, a handover request is not received at step 702, it is determined, at step 706, if the call configuration has been modified, i.e., if any service requests have been received by either the first or second switching centers (201–202) requiring the operating modes of the first and/or the second transcoders (221–222) to be changed.

Assuming that the call configuration has been modified as the result of a change in service for the call, i.e., a three-party conference call is to be established, the switching center that has received the service request sends a modify mobile-tomobile message to the other switching center, wherein the modify mobile-to-mobile message includes a modification indicator. For example, if the first switching center (201) receive a request for a three-party conference call involving the first and second mobile units (218–219), the modification indicator included in the modify mobile-to-mobile message sent by the first switching center (201) instructs the second switching center (202) to alter the state of the second transcoder (222). Thus, at step 708, the second switching center (202) instructs the second transcoder (222) to operate in the transcoding mode in order to accommodate the conferencing bridge used for the three-party call.

Of course, the example given is equally applicable in the opposite direction, i.e., from the second switching center (202) to the first switching center (201). Additionally, subsequent modifications to the call configuration can be accommodated in the same manner. Continuing the previous example, when the three-party conference call is to be terminated, the first switching center (201) sends a modify mobile-to-mobile message wherein the modification indicator instructs the second switching center (202) to change the operating mode of the second transcoder (223) to the transparent mode. Thus, using the methods described in FIGS. 6 and 7, the present invention allows mobile-to-mobile calls to be established and maintained such that the need for multiple transcoder conversions are avoided. Using a series of messages between switching centers, HLRs, and VLRs, the present invention allows switching centers to determine that a call being processed is actually a mobile-to-mobile call, which was not possible in prior art systems.

Figure 8:
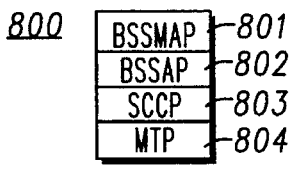
FIG. 8 illustrates a protocol stack used to pass control information between switching centers, site controllers, and transcoders.
Figure 9:
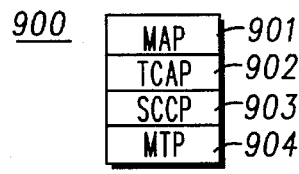
FIG. 9 illustrates a protocol stack used to pass control information between switching centers, home location registers, and visiting location registers.

FIGS. 8 and 9 illustrate protocol stacks used to pass control information as described above. In the context of the present invention, the term protocol stack is used to describe protocols adhering to the Open System Interconnection (OSI) model promulgated by the International Standards Organization (ISO). In particular, FIG. 8 illustrates a protocol stack (800) used to pass control information between switching centers, site controllers, and transcoders; FIG. 9 illustrates a protocol stack used to pass control information between switching centers, home location registers, and visiting location registers.

The protocol stack (800) used to pass control information between switching centers, site controllers, and transcoders comprises four layers in compliance with known control signaling standards. The physical and link layers of the protocol stack comprises the Message Transfer Part (MTP) (804). The network layer comprises the Signaling Connection Control Part (SCCP) (803). The physical, link, and network layers (903–804) described are in conformance with the so-called Signaling System Seven (SS7) protocol commonly used in communication systems of the type described above. The application layer comprises two separate parts: the Base Station System Application Part (BSSAP) (802) and the Base Station System Management Application Part (BSSMAP) (801). The BSSAP and BSSMAP layers (801–802) are used to pass the control information, as described above, between switching centers, site controllers, and transcoders. For example, an instruction for a transcoder to change operating modes would be passed in the BSSAP and BSSMAP layers (801–802) from a switching center to a transcoder, possibly via a site controller.

As shown, the protocol stack (900) used to pass control information between switching centers, home location registers, and visiting location registers also comprises four layers in compliance with known control signaling standards. The physical and link layers of the protocol stack comprises the Message Transfer Part (MTP) (904). The network layer comprises the Signaling Connection Control Part (SCCP) (903). The transport layer comprises the Transaction Capabilities Application Part (TCAP) (902). These layers (902–904) together are in conformance with the SS7 protocol. The application layer comprises the Mobile Application Part (MAP) (901). It is the MAP layer (901) that is used to communicate control information, as described above, between switching centers, HLRs, and VLRs. For example, the modify mobile-to-mobile message would be sent within the MAP layer (901).

The present invention a method for establishing and maintaining calls between mobile units in single and multiple switching center configurations such that multiple transcoder format conversions are avoided. This is accomplished by providing control messaging capabilities such that switching centers can determine that a mobile-to-mobile call is in progress. Knowing this, the switching centers can instruct transcoders to allow compressed digital voice to be passed in an essentially transparent manner, thereby avoiding multiple format conversions.

We claim:

1. In a communication system that comprises a switching center and at least one site controller in communication with the switching center via at least two transcoders, a method for the switching center to establish a call, the method comprising the steps of:

a) responsive to a call request from a first mobile unit associated with the at least one site controller, instructing a first transcoder of the at least two transcoders to operate in a transcoding mode;

b) determining that the call request is for a second mobile unit;

c) instructing a second transcoder of the at least two transcoders to operate in a transparent mode;

d) alerting the second mobile unit of the call;

e) when the second mobile unit has responded, instructing the first transcoder to operate in the transparent mode; and f) completing the call between the first mobile unit and the second mobile unit.

2. The method of claim 1, step (a) further comprising the steps of:

a1) instructing, by the switching center, the at least one site controller to notify the first transcoder; and a2) notifying, by the at least one site controller, the first transcoder to operate in the transcoding mode.

3. The method of claim 2, step (a) further comprising the step of notifying the first transcoder to operate in the transcoding mode, wherein the first transcoder converts compressed digital voice into non-compressed digital voice and vice versa when operating in the transcoding mode.

4. The method of claim 1, step (c) further comprising the steps of:

c1) instructing, by the switching center, the at least one site controller to notify the second transcoder; and c2) notifying, by the at least one site controller, the second transcoder to operate in the transparent mode.

5. The method of claim 4, step (c) further comprising the step of notifying the second transcoder to operate in the transparent mode, wherein the second transcoder passes compressed digital voice as bit-stuffed compressed digital voice and vice versa when operating in the transparent mode.

6. The method of claim 5, step (c) further comprising the step of notifying the second transcoder to operate in the transparent mode, wherein the bit-stuffed compressed digital voice comprises portions of compressed digital voice prefixed by stuff bits so as to emulate the non-compressed digital voice.

7. The method of claim 1, further comprising the steps of:
   g) receiving a handover request from the at least one site controller;
   h) identifying a target site controller based on the handover request, wherein the target site controller is in communication with the switching center via a third transcoder; and
   i) notifying the third transcoder to operate in the transparent mode.

8. The method of claim 1, further comprising the steps of:
   g) receiving a service request from one of a first set that includes the first mobile unit and the second mobile unit;
   j) responsive to the service request, determining a call configuration; and
   k) upon determining the call configuration, instructing at least one transcoder of a second set that includes the first transcoder and the second transcoder to operate in the transcoding mode.

9. The method of claim 8, further comprising the steps of:
   l) receiving a subsequent service request from one of the first set;
   m) responsive to the subsequent service request, determining a subsequent call configuration; and
   n) upon determining the subsequent call configuration, instructing at least one transcoder of the second set to operate in the transparent mode.

10. In a communication system that comprises a plurality of mobile units capable of wirelessly transmitting and receiving compressed digital voice, a first site controller in wireless communication with the plurality of mobile units, a second site controller in wireless communication with the plurality of mobile units, and a switching center that routes non-compressed digital voice, wherein the first site controller is in communication with the switching center via a first transcoder and the second site controller is in communication with the switching center via a second transcoder, a method for the switching center to establish a call between a first mobile unit of the plurality of mobile units and a target unit via the switching center, the method comprising the steps of:
   a) receiving a call request from the first mobile unit, wherein the call request includes an identification of the target unit;
   b) responsive to the call request, instructing the first transcoder to operate in a transcoding mode;
   c) determining, based on the identification of the target unit, if the target unit is a second mobile unit of the plurality of mobile units;
   d) upon identifying the second mobile unit, instructing the second transcoder to operate in a transparent mode;
   e) alerting the second mobile unit of the call;
   f) when the second mobile unit has responded to the call, instructing the first transcoder to operate in the transparent mode; and
   g) completing the call between the first mobile unit and the second mobile unit.

11. The method of claim 10, step (b) further comprising the steps of:
   b1) instructing, by the switching center, the first site controller to notify the first transcoder; and
   b2) notifying, by the first site controller, the first transcoder to operate in the transcoding mode.

12. The method of claim 11, step (b) further comprising the step of notifying the first transcoder to operate in the transcoding mode, wherein the first transcoder converts compressed digital voice into non-compressed digital voice and vice versa when operating in the transcoding mode.

13. The method of claim 10, step (d) further comprising the steps of:
   d1) instructing, by the switching center, the second site controller to notify the second transcoder; and
   d2) notifying, by the second site controller, the second transcoder to operate in the transparent mode.

14. The method of claim 13, step (d) further comprising the step of notifying the second transcoder to operate in the transparent mode, wherein the second transcoder passes compressed digital voice as bit-stuffed compressed digital voice and vice versa when operating in the transparent mode.

15. The method of claim 14, step (d) further comprising the step of notifying the second transcoder to operate in the transparent mode, wherein the bit-stuffed compressed digital voice comprises portions of compressed digital voice prefixed by stuff bits so as to emulate the non-compressed digital voice.

16. The method of claim 10, further comprising the steps of:
   h) receiving a handover request from one of a set that includes the first site controller and the second site controller;
   i) identifying a target site controller based on the handover request, wherein the target site controller is in communication with the switching center via a third transcoder; and
   j) notifying the third transcoder to operate in the transparent mode.

17. The method of claim 10, further comprising the steps of:
   h) receiving a service request from one of a first set that includes the first mobile unit and the second mobile unit;
   i) responsive to the service request, determining a call configuration; and
   j) upon determining the call configuration, instructing at least one transcoder of a second set that includes the first transcoder and the second transcoder to operate in the transcoding mode.

18. The method of claim 17, further comprising the steps of:
   k) receiving a subsequent service request from one of the first set;
   l) responsive to the subsequent service request, determining a subsequent call configuration; and
   m) upon determining the subsequent call configuration, instructing at least one transcoder of the second set to operate in the transparent mode.

19. In a communication system that comprises a first switching center in communication with a second switching center, a first site controller in wireless communication with a first set of mobile units, and a second site controller in wireless communication with a second set of mobile units, wherein the first switching center is in communication with a home location register and the home location register is in communication with a visiting location register, wherein the second switching center is in communication with the visiting location register, and wherein the first site controller is in communication with the first switching center via a first transcoder and the second site controller is in communication with the second switching center via a second transcoder, a method for call set-up between a first mobile unit of the first set of mobile units and a second mobile unit of the second set of mobile units, the method comprising the steps of:

a) receiving, by the first switching center via the first site controller, a call request from the first mobile unit, wherein the call request includes a phone number of the second mobile unit;
   b) instructing, by the first site controller, the first transcoder to operate in a transcoding mode or in a transparent mode;
   c) responsive to the call request, sending, by the first switching center to the home location register, a first routing information request that includes a first switching center address, a call process identification, and the phone number of the second mobile unit;
   d) responsive to the first routing information request, determining, by the home location register, an identification of the second mobile unit; and
   e) sending, by the home location register to the visiting location register, a second routing information request that includes the first switching center address, the call process identification, and the identification of the second mobile unit.

20. The method of claim 19 further comprising the steps of:
   f) responsive to the second routing information request, sending, by the visiting location register to the home location register, a roaming phone number of the second mobile unit; and
   g) upon receiving the roaming phone number of the second mobile unit, sending, by the home location register to the first switching center, the roaming phone number of the second mobile unit.

21. The method of claim 20, further comprising the steps of:
   h) sending, by the first switching center to the second switching center, a phone call request that includes the roaming phone number of the second mobile unit;
   i) responsive to the phone call request, sending, by the second switching center to the visiting location register, a third routing information request that includes the roaming phone number of the second mobile unit; and
   j) responsive to the third routing information request, sending, by the visiting location register to the second switching center, the first switching center address and the call process identification.

22. The method of claim 21, further comprising the steps of:

k) establishing, by the second switching center, communications with the second mobile unit;
   l) instructing, by the second switching center, the second transcoder to operate in a transparent mode;
   m) sending, by the second switching center based on the first switching center address, a mobile-to-mobile connection message to the first switching center, wherein the mobile-to-mobile connection message includes the call process identification; and
   n) instructing, by the first switching center, the first transcoder to operate in the transparent mode.

23. The method of claim 22, further comprising the step of:
   o) sending, by the first switching center to the second switching center, a modify mobile-to-mobile message that includes a modification indicator; and
   p) based on the modification indicator, instructing, by the second switching center, the second transcoder to operate in the transcoding mode.

24. The method of claim 22, further comprising the step of:
   o) sending, by the second switching center to the first switching center, a modify mobile-to-mobile message that includes a modification indicator; and
   p) based on the modification indicator, instructing, by the first switching center, the first transcoder to operate in the transcoding mode.

25. The method of claim 22, further comprising the steps of:
   o) receiving, by the first switching center, a handover request;
   p) determining, by the first switching center, a target switching center;
   q) sending, by the first switching center to the target switching center, a handover message; and
   r) responsive to the handover message, instructing, by the target switching center, a third transcoder to operate in the transparent mode.

26. The method of claim 22, further comprising the steps of:
   o) receiving, by the second switching center, a handover request;
   p) determining, by the second switching center, a target switching center;
   q) sending, by the second switching center to the target switching center, a handover message; and
   r) responsive to the handover message, instructing, by the target switching center, a third transcoder to operate in the transparent mode.

* * * * *